United States Patent
Maeda et al.

(10) Patent No.: US 7,152,184 B2
(45) Date of Patent: ***Dec. 19, 2006

(54) STORAGE DEVICE, BACKUP METHOD AND COMPUTER PROGRAM CODE OF THIS STORAGE DEVICE

(75) Inventors: Seiji Maeda, Kanagawa-ken (JP); Hirokuni Yano, Kanagawa-ken (JP); Toshio Shirakihara, Kanagawa-ken (JP); Kiyoko Sato, Kanagawa-ken (JP); Nobuo Sakiyama, Kanagawa-ken (JP); Takuya Hayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

This patent is subject to a terminal disclaimer.

(21) Appl. No.: 11/046,844

(22) Filed: Feb. 1, 2005

(65) Prior Publication Data

US 2005/0132157 A1    Jun. 16, 2005

Related U.S. Application Data

(63) Continuation of application No. 10/301,613, filed on Nov. 22, 2002, now Pat. No. 6,883,112.

(30) Foreign Application Priority Data

Nov. 22, 2001    (JP)    ............................ P2001-356881
Oct. 15, 2002    (JP)    ............................ P2002-299850

(51) Int. Cl.
*G06F 11/20*    (2006.01)
(52) U.S. Cl. ............................ 714/6; 711/162; 711/114; 707/204

(58) Field of Classification Search ................ 711/162, 711/161, 112, 114; 714/2, 6, 7, 15; 707/204
See application file for complete search history.

(56) References Cited

U.S. PATENT DOCUMENTS

| | | | |
|---|---|---|---|
| 5,276,867 A * | 1/1994 | Kenley et al. ............... 707/204 |
| 5,615,329 A | 3/1997 | Kern et al. |
| 6,131,147 A | 10/2000 | Takagi |
| 6,237,008 B1 * | 5/2001 | Beal et al. ................... 707/204 |
| 6,253,295 B1 * | 6/2001 | Beal et al. ................... 711/162 |
| 6,266,784 B1 | 7/2001 | Hsiao et al. |
| 6,529,944 B1 | 3/2003 | LeCrone |
| 6,557,089 B1 | 4/2003 | Reed et al. |
| 6,631,477 B1 * | 10/2003 | LeCrone et al. ................ 714/5 |
| 6,640,291 B1 * | 10/2003 | Fujibayashi et al. ......... 711/162 |
| 6,795,895 B1 | 9/2004 | Merkey et al. |

FOREIGN PATENT DOCUMENTS

JP    2002-108571    4/2002

* cited by examiner

*Primary Examiner*—Hong Kim
(74) *Attorney, Agent, or Firm*—Oblon, Spivak, McClelland, Maier & Neustadt, P.C.

(57) ABSTRACT

A storage device for which restoration of data is possible without the need for excess equipment includes mirrored storage units for online use and for backup, and is capable of performing a data backup while continuing input and output of data. The storage device is further provided with an update data storage unit for storing update data. According to the storage device, even if the information stored in a storage unit for online use is not capable of being read because of a fault in the storage unit, it is possible to restore the data in the backup storage unit to the state that existed in the storage unit for online use immediately before the fault by applying the update data to the information stored in the storage device for backup.

10 Claims, 5 Drawing Sheets

STORAGE DEVICE, BACKUP METHOD AND COMPUTER PROGRAM CODE OF THIS STORAGE DEVICE

CROSS-REFERENCE TO RELATED APPLICATIONS

This application is a continuation of U.S. patent application Ser. No. 10/301,613, filed Nov. 22, 2002, which issued as U.S. Pat. No. 6,883,112 on Apr. 19, 2005, and which claims the benefit of priority from the prior Japanese Patent Applications No. 2001-356881, filed Nov. 22, 2001, and No. 2002-299850, filed Oct. 15, 2002, the entire contents of each or which are incorporated herein by reference.

BACKGROUND OF THE INVENTION

1. Field of the Invention

The present invention relates to a storage device to be used for a computer system or the like and a backup method of this storage device. Particularly, the present invention relates to a storage device having a redundancy and a backup method of a data that is stored in this storage device.

2. Discussion of the Background

Since computers have been used as part of the social infrastructure, nearly every social system has developed to use information systems. In accordance with this, the total amount of information to be treated by computer has rapidly increased, so that a computer having a high throughput capacity has been demanded. Regarding progress in the throughput capacity of computers, the amount of information capable of being treated at the same time has expanded, so that large databases may be constructed.

In order to maintain such a system, it is necessary to prevent the disappearance of data because of faults of the storage media and operational mistakes or the like. However, as a database becomes larger, it is often the case that its operation becomes more difficult. Such a large scale database is often used for a system that is important as part of the social infrastructure, so stopping even for a short time, in fact, is not allowed.

In order to protect the contents of data from a failure because of a storage media fault or operation mistake, it is effective to store the replicated data in a storage device different from a magnetic disk storage drive which is generally used as a storage device. It is preferable that the storage media used by other storage devices can store the data more stably compared to magnetic disk storage drives. To store the replicated data in order to protect the data stored in the storage device from failure in this way is referred to as backup.

However, it is not possible with such a method to realize the 24-hour service that is required from the social infrastructure because the media for storage and saving generally has a slow access rate, and takes a long time to write a large amount of information therein. In addition, during backup, it is necessary to stop the update process into a database so that the information stored in the database is not updated by a system. For this reason, when the information stored in the database is replaced with the new information by the update process, there is a possibility that integrity between the information that has been already backed-up in the database and the information that has not been backed-up yet is lost. Even if the data lacking the integrity is restored in the database, it is not possible to restore the normal condition of the database.

Alternatively, the magnetic disk storage drive that has been generally used as the storage device necessarily has moving parts, so that it has a higher probability of becoming defective compared to a main component of the computer, for example, a processor and a memory. For example, assuming system inspection is performed on a weekly basis, the information stored in the magnetic disk storage drive is backed up in other storage media capable of storing the large amount of data stably. In that case, if the database becomes unavailable because the magnetic disk storage drive is defective or an improper data update is performed, it is possible to restore the data on the basis of this backup information. However, according to a system for frequently performing the data update process, although it is possible to restore the contents of the information that is stored in the magnetic disk storage drive on the weekly backup, it is not possible to restore it to the condition just before the magnetic disk storage drive becomes defective. This is because the update process, which has been performed with respect to the database after backup, is not capable of being restored. Therefore, a method is also employed such that a history after the update (referred to as an update journal) is additionally collected and this update journal is restored together with the information after backup.

However, according to a background method for merely backing-up the contents of a database, it is necessary to stop temporarily the data update during the backup. Further, when a failure occurs in the magnetic disk storage drive itself, there is the problem that all system services are stopped until the database has been completely restored from the backed-up data. Therefore, with respect to the magnetic disk storage drive having a high possibility of a fault, a method is employed such that a plurality of magnetic disk storage drives are provided to store the same contents therein so that it is possible to continue the normal operation even when a failure occurs.

The above described system to manage and use a plurality of magnetic disks by the gross is referred to as a disk array. In order to store the information in the disk array in a plurality of storage devices, a method referred to as a RAID (Redundant Arrays of Inexpensive Disks) is generally used. Although actually consisting of a plurality of magnetic disk storage drives at the driver or hardware level, a RAID system appears as a single storage device for an application to be operated on the computer.

However, even if a system failure can be avoided according to the above described method, the backup of the data stored in the storage device is still necessary. For this reason, a technology such as RAID is effective for a rather minor hardware failure but is not as effective for remedying an improper data update because of an operation mistake caused by human error, since the system itself is not capable of detecting that the data is updated by the operation mistake. Therefore, a system has been required to perform the backup process, which can take long hours, without stopping the database system. This method is generally referred to as an online backup.

The background online backup is roughly divided into two methods. One method is performed as one function of the application but the other method makes use of the above mentioned RAID system magnetic disk storage drive.

According to the former method, for example, the data backed up by an application program is not directly updated. However, the data update that is performed by another application for updating the information of the same storage device is not generally considered. Therefore, some plans are required so that the system maintains integrity of all of the information stored in the storage device at a user's side or the like.

According to the latter method making use of a RAID system, the backup of data is performed at the level of magnetic disk storage drive, the level of the application as in the former method. Therefore, it is not necessary to consider the integrity of the data per application, with the advantage that the former consideration is not required.

The latter method is realized by the mirrored plurality of magnetic disk storage drives that are generally defined as RAID1. The mirroring serves to perform the same update with respect to a plurality of magnetic disk storage drives when updating the data stored in the magnetic disk storage drive. Therefore, upon reading the data from the magnetic disk storage drive, it is possible to obtain the same content granted that the data is read from any magnetic disk storage drive. Upon backup, this system releases the mirroring and specifies a first set of magnetic disk storage drives for online update and a second set for backup, respectively. Two processes—the update and the backup by the application— make progress in parallel in one storage device. If the backup of the data stored in the magnetic disk storage drive(s) for backup is terminated, the contents after the update of the online update set of disk storage drives is copied to the backup set of disk storage drives. When the contents of the backup set become up-to-date, mirroring of both sets of magnetic disk storage drives is started and the process returns to RAID1 operation. Thereafter, even if a failure occurs in any of the magnetic disk storage drives, the information to be stored in this storage device is secured by the content stored in the other magnetic disk storage drive(s).

Such an online backup method making use of the RAID system storage device can be regarded as an appropriate method since it does not require a specific device. However, according to this method, during the backup, the mirroring of the storage device should be released. If the mirroring is released and only one magnetic disk storage device is allowed to be updated, it is a matter of course that the information to be stored by respective magnetic disk storage drives is altered. This means that data reconstruction is not secured against a fault of the data because of a failure of a magnetic disk storage drive until the storage device is mirrored again. For example, even if a method for shortening the time required for applying a snapshot is presented, it is not possible to overcome the failure of a magnetic disk storage drive under conditions where the mirroring is released for the backup.

In order to restore the data, for example, another set of magnetic disk storage drives may be provided. Further, there is a method for realizing restoration of the data by the information stored in the storage device that is newly prepared even during backup of the data.

However, considering the rate of occurrences of failure, such a business investment is not realistic in terms of operation cost. Furthermore, the larger the data amount to be stored, the larger the magnetic disk storage drive corresponding to the data amount must be. Therefore, except for certain cases, this method is difficult to use as a general solution.

SUMMARY OF THE INVENTION

According to one aspect of the present invention, a storage device, as well as its backup method and computer program code, is provided that is capable of restoring data, whereby the online backup can be performed while allowing fault-tolerant continuous input and output without the need for the above described excess equipment.

The present invention may provide a storage device for continuous input and output of data even if a portion of the above mentioned storage unit has a failure, by updating the data stored in a plurality of storage units so that the contents thereof become the same, respectively. The invention may include a first storage unit as a portion of the above mentioned plural storage units for updating data continuously even during a backup; a second storage unit as a portion of the above mentioned plural storage units other than the above mentioned first storage unit, storing the data to be backed up having the same data storage capacity as that of the above mentioned first storage unit; a third storage unit for storing the update data received during the backup, which is provided with a data storage capacity that is smaller than that of the above mentioned first storage unit; and a control unit for receiving the data update even during the backup by updating the data stored in the above mentioned first storage unit while backing up the data stored in the above mentioned second storage unit and updating data stored in the above mentioned second storage unit on the basis of the update data stored in the above mentioned third storage unit to restore the data stored in the above mentioned first storage unit at the point of time when a failure occurs in the above mentioned first storage unit during the backup.

In addition, the present invention may provide a backup method in a storage device for fault-tolerant continuous input and output of data even if a portion of the above mentioned storage unit has a failure, by updating the data stored in a plurality of storage units so that their contents become the same. The above mentioned method includes receiving the update data while backing-up the data stored in the above mentioned second storage unit, subsequently storing the update data in the above mentioned third storage unit; and updating the data stored in the above mentioned first storage unit. According to the above mentioned method, when there is a failure in the first storage unit during the backup, an update occurs to the data stored in the second storage unit on the basis of the update data stored in the third storage unit, and the data that has been stored in the first storage unit is restored by the updated second storage unit when the failure has occurred.

Further, the present invention may provide a computer program code in a storage device for fault-tolerant continuous input and output of data by updating the data stored in a plurality of storage units so that the contents thereof become the same. The above mentioned computer program code includes: a first computer code for backing-up the data stored in the above mentioned second storage unit; a second computer program code for receiving the update data and subsequently storing this update data in the third storage unit; and a third computer program code for updating the data stored in the above mentioned first storage unit. According to the above mentioned computer program code, when there is a failure in the first storage unit during the backup, an update occurs to the data stored in the second storage unit on the basis of the update data stored in the third storage unit, and the data that has been stored in the first storage unit is restored on the basis of the updated data in the second storage unit when the failure has occurred.

According to embodiments of this storage device, the backup method and the computer program code, only by providing a storage device having a capacity for accumulating the update data during a backup is it possible to perform the update and the backup in parallel with respect to the present storage device. Further, it is usual that the update data to be updated during the backup is far less than the original data amount. Therefore, it is possible to prevent an equipment investment more than the constitution of RAID by using excessive storage devices.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
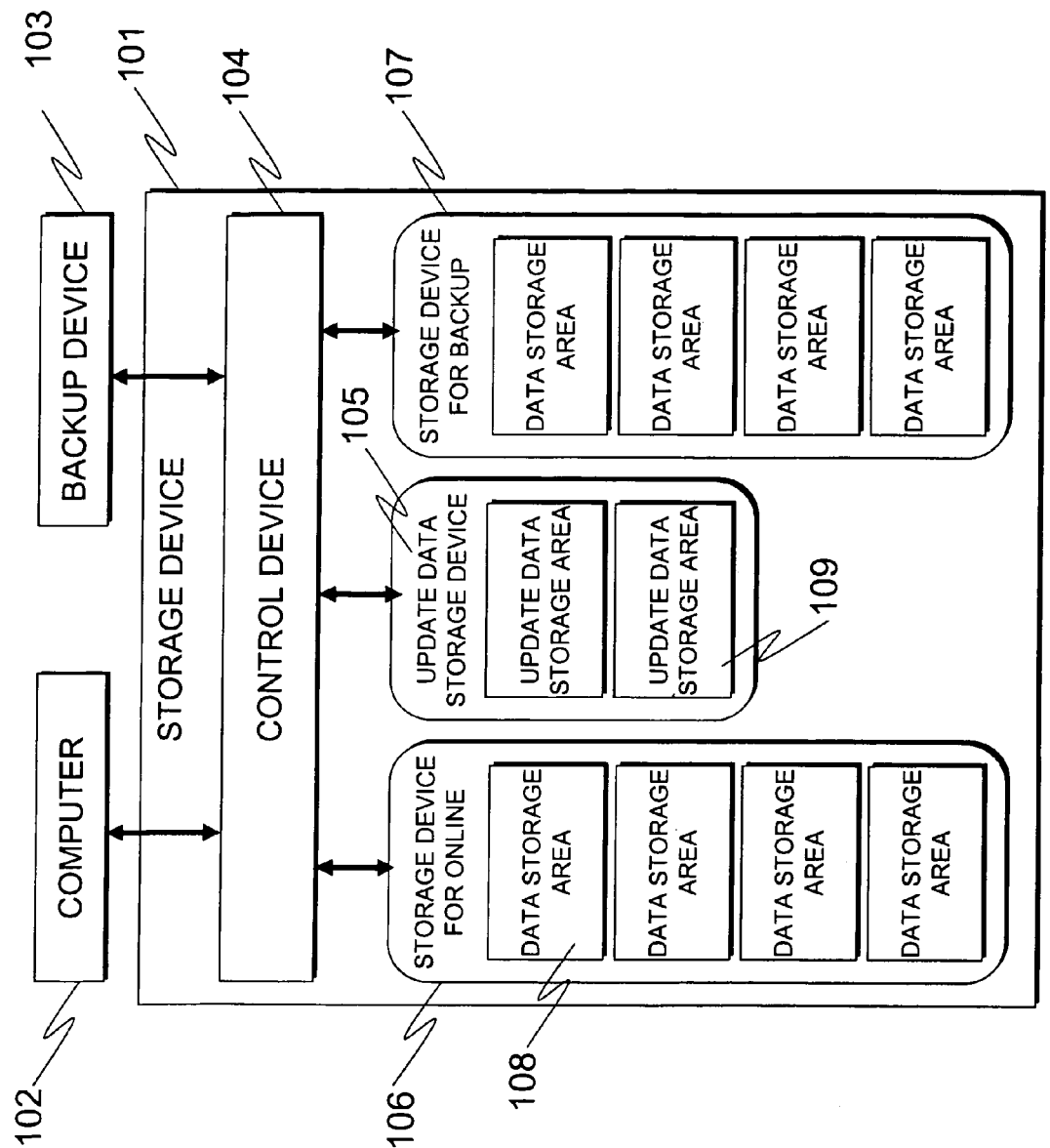
FIG. 1 is a block diagram of a storage device according to an embodiment of the present invention.

FIG. 1 is a block diagram of a storage device 101 according to an embodiment of the present invention.

FIG. 1 includes the storage device 101, a computer 102, a backup device 103, a control device 104, an update data storage device 105, a storage device for online 106, a storage device for backup 107, a data area 108, and an update data storage area 109 shown.

The computer 102 is a computer for executing an application program to retrieve and update the data stored in the storage device 101 in the process of executing the program.

The backup device 103 is a device for reading the data stored in the storage device 101 to backup the data in addition to the retrieve and update processes performed by the computer 102. The backup device 103 is provided with a mass storage media for storing the backed-up data. The mass storage media, for example, a magnetic tape device and an optical disk drive are used, are selected to be suitable for mass storage. A media for backup is not limited to those herein described but any media capable of storing the information stably may be used.

Next, the block diagram of the storage device 101 will be explained below.

The storage device 101 operates by receiving instructions such as "read" and "write" from the computer 102. Initially, these instructions are interpreted by the control device 104. These interpreted instructions are transmitted to the update data storage device 105, the storage device for online 106, and the storage device for backup 107, which have the same constitution. Under normal conditions, the storage device for online 106 and the storage device for backup 107 are updated by the update requirement from the computer 102 so that their contents are the same.

In this case, in addition to storage contents stored in the same code, for example, the storage contents stored in data-compression are also updated to be the same. Accordingly, the data on the plural storage devices may be regarded as the same with each other. When two sets of data having the same contents are stored in two storage devices, for example, even if one storage device becomes incapable of being read, it is possible to continue reading and writing the data in other storage device. By constituting the storage device 101 in this way, it is possible to continue processing without having an effect on the application program being run on the computer 102.

The storage device for online 106 and the storage device for backup 107 include at least one data storage area 108. The data storage area 108 indicates, for example, a physical boundary arising from hardware—for example, an area partitioned in a magnetic disc case unit, a track unit, or a sector unit. Alternatively, this unit may be based on an I/O unit (referred to as a block) decided by a format that is applied to the storage device for online 106 and the storage device for backup 107. Alternatively, the unit may be a volume unit determining a logical segment within the storage device or a file unit to be represented as a connection of series of data.

The update data storage device 105 is mainly used for storing the update data while executing the online backup. The online backup is the process for storing the data stored in the storage device for backup 107 in the backup device 103 while performing the update in the storage device for online 106 with the computer 102. It is preferable that the update data storage device 105 be constituted as a separate storage device in terms of hardware so that it is not affected by any failure occurring in the storage device for online 106 or the storage device for backup 107. By storing the update data in a storage device other than the storage device for online 106 in this way, even if the storage device for online 106 becomes incapable of being read due to a failure, the update data updated by the computer 102 can be secured. With only the update data updated by the computer 102, by combining this data with the data stored in the storage device for backup 107, it is possible to reproduce the state identical to the state when the computer 102 updated the storage device for online 106.

According to the present embodiment, the update data to be stored in the update data storage device 105 only includes the update information with respect to the update by the computer 102 during the online backup. Therefore, it is acceptable for the update data storage device 105 to have a small storage capacity.

When the storage device for backup 107 of the storage device 101 saves the data stored therein in the backup device 103, the control device 104 controls the storage device for online 106 and the storage device for backup 107 differently. The control device 104 inhibits writing in the storage device for backup 107 and backs up the data stored in the storage device for backup 107 in the backup device 103.

In FIG. 1, the backup device 103 is shown as a single device; however, in accordance with a small-scale system design or the like, the computer 102 itself may provide the function of the backup device 103 in hardware or software.

On the other hand, the storage device for online 106 is updated on the basis of the update request from the computer 102 even during a backup. In this case, the control device 104 updates the data stored in the storage device for online 106 in accordance with the update request and further, transmits the update request to the update data storage device 105. Receiving this update request, the update data storage device 105 stores this update request in the update data storage area 109 in turn.

A relationship between the data respectively stored in the update data storage device 105, the storage device for online 106, and the storage device for backup 107 in this time will be described below.

Initially, a method to restore the update data and the backup data when the failure occurs after the mirroring of the storage device for online 106 and the storage device for backup 107 upon the online backup is released will be explained.

The control device 104 stores the update request that has been transmitted by the computer 102 in the update data storage device 105 in turn. Further, the data of the storage device for online 106 is also updated on the basis of the update request. In this case, a result updated by the update request of the computer 102 includes the data on the storage device for online 106, so that, with only the update request and the data of the storage device for backup 107, it is possible to reproduce the data after the update by the computer 102. In other words, with respect to the state of the data after the update by the computer 102, the same data are stored in two ways by the storage device for online 106 and by the update request stored in the update data storage device 105 and the storage device for backup 107.

When a failure occurs in the storage device for online 106, if the update request stored in the update data storage device 105 is executed in turn on the storage device for backup 107, it is possible to restore the state of data after the update by the computer 102 during the online backup. In addition, even when the failure occurs in the update data storage device 105, if the storage device for online 106 is in a normal condition, the latest data is not lost. In the same way, even when a failure occurs in the storage device for backup 107, if the storage device for online 106 is in a normal condition, there is no loss of data.

In this way, even under the condition that the mirroring is released during the online backup, if either the storage device for online 106 on the one hand or the update data storage device 105 and the storage device for backup 107 on the other hand is or are normal, it is possible to reproduce the update that has been performed during the online backup. Accordingly, the storage device 101, which is capable of restoring the data, further can perform the online backup as continuing the update process of the computer 102.

If the backup of the storage device for backup 107 has finished, in order to start the mirroring again, the contents of the data stored in the storage device for online 106 and the storage device for backup 107 are made equal. In order to make the contents equal, it is a simple method to copy all contents from the storage device for online 106 into the storage device for backup 107.

However, in the case that the data amount stored in the storage device for online 106 is large, it takes a long time for direct copying. Therefore, according to the present embodiment, it is possible to employ a method to apply the update request that has been stored in the update data storage device 105 to the storage device for backup 107 in turn. It is very advantageous for shortening the time for the backup process to update only the portion that is updated by the computer 102 on the basis of the update request, which is stored in the update data storage device 105.

If the update by the stored update request is finished, the contents of the storage device for online 106 and the storage device for backup 107 are made equal, so that it is possible to perform the mirroring again.

Some methods can be considered in order to update the contents of the storage device for backup 107 on the basis of the update request stored in the update data storage device 105 in the case of performing the mirroring again. However, a method to overwrite the update data on the basis of the update request on the storage device for backup 107 by a normal I/O command is most popular.

In this case, if the update request updates the data in a logical unit such as a block or the like, the update data may be logically replaced without updating the data in accordance with the I/O command. For example, if the data storage area 108 of the storage device for backup 107 and the update data storage area 109 of the update data storage device 105 are storage areas having the same sizes, it is possible to logically replace the update data. It is assumed that respective storage areas include a storage device for decoding a logical address such as a memory and accessing it. According to such a storage device, it is possible to logically replace the data by providing an address converter along an address bus. Alternatively, assuming that the update data storage device 105 is a disk drive that is physically attachable and detachable, according to a method to attach and detach this disk drive, it is also possible to logically replace the update data.

Alternatively, without using the above described methods, for example, the control device 104 may control an access requirement from the computer 102 and the backup device 103 so that the data areas are logically replaced.

If the data storage area 108 of the storage device for backup 107 and the update data storage area 109 of the update data storage device 105 are constituted so that they can be logically replaced without depending on the update process, the update requirement stored in the update data storage device 105 need not be updated, so that it is possible to shorten a time for mirroring by a large margin.

There is also a case that the data stored in the storage device 101 includes a file of a logical series of data area. When the update request relates to the file, if the control device 104 is provided with a function to judge a constitution of the file, it is also possible to perform the update process in a file unit. In addition, even if the failure occurs in the storage device for online 106 upon the online backup, according to the update request stored in the storage device for backup 107 and the update data storage device 105, it is possible to restore the latest data in a file unit.

Normally, it is often the case that the data to be treated by the computer 102 is treated in a file. Such an organization enables the latest data to be restored in a file unit.

In addition to the above described case, it is also possible to update the latest data in a magnetic disk unit. The I/O command for operating the storage device includes the information showing in which magnetic disk drive the data is written and read. On the basis of this information, it is possible to update the data as only picking out the update request that has been performed with respect to the magnetic disk drive for updating the data into the latest condition.

According to such an organization, it is possible to replace only the magnetic disk drive in which the failure has occurred to obtain the latest condition.

According to the present embodiment, the examples of two storage devices, namely, the storage device for online 106 and the storage device for backup 107 are illustrated. However, it is not necessary that a plurality of storage devices are defined in advance by intended use as the storage device for online 106 and the storage device for backup 107. In the case that the intended purpose is not defined in advance, the control device 104 may define the intended use with respect to each storage device from a plurality of storage devices.

In the next case, the operation of the storage device 101 in the case of the normal usage condition, the online backup, and return to the normal usage condition will be described below as an example of the present embodiment.

Figure 2:
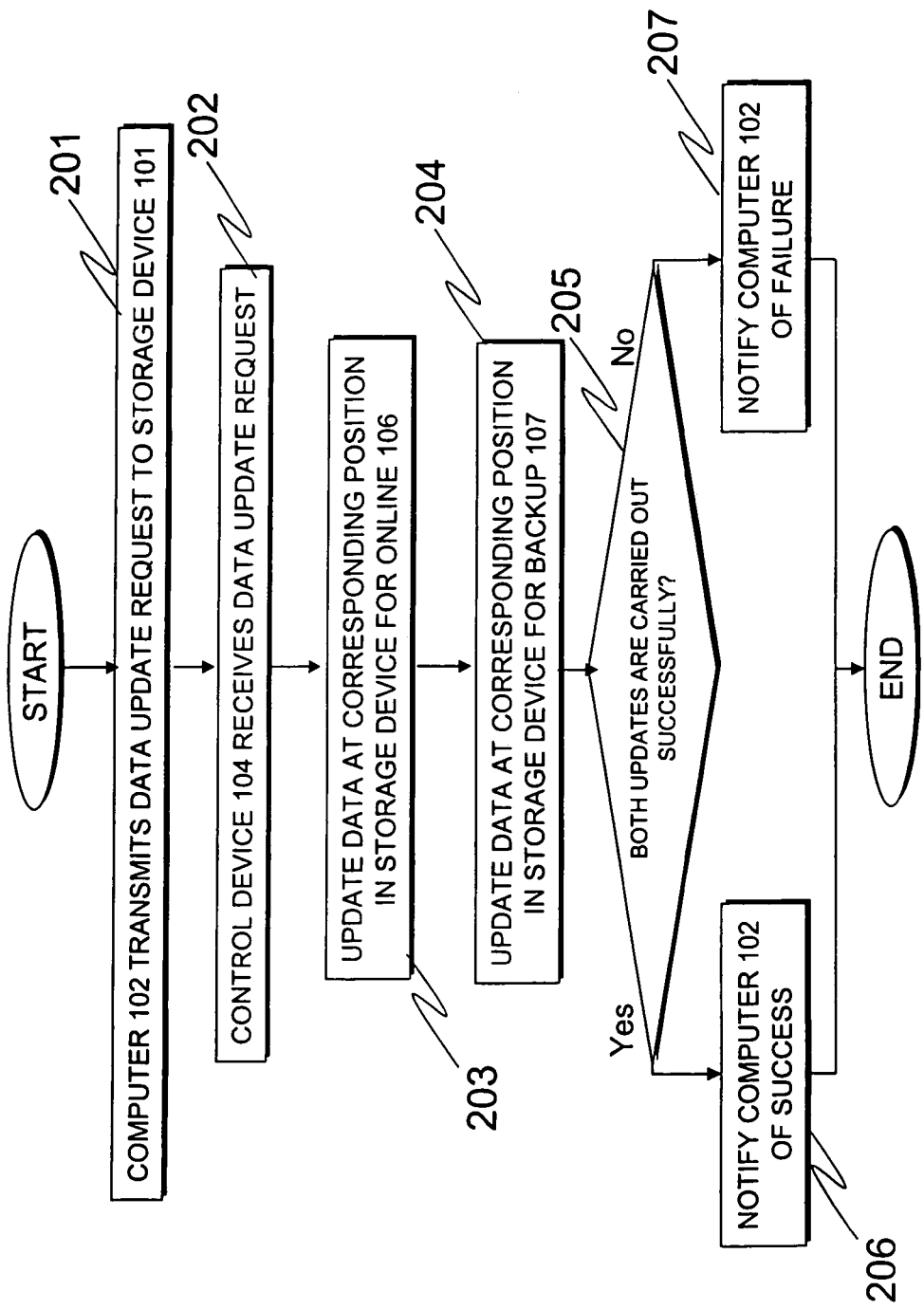
FIG. 2 is a flow chart for showing a process under a normal condition of a storage device according to an embodiment of the present invention.

Initially, the operation in the normal usage condition when the reading and writing of the data are performed by the computer 102 will be explained in accordance with a flow chart shown in FIG. 2.

In the process of the application process, the computer 102 transmits the update request to the storage device 101 (step 201). Receiving this request, the control device 104 instructs both of the storage device for online 106 and the storage device for backup 107 to update the corresponding portions of the data stored therein in accordance with this request (steps 202, 203, and 204). The control device 104 judges whether or not the step 203 and the step 204 are normally carried out (step 205). Then, in the case that the both steps are carried out successfully, Yes in step 205, the control device 104 notifies the computer 102, which has issued the update request, of the success of the update in step 206. In this time, if any one of the steps 203 and 204 fails, No in step 205, the control device 104 notifies the computer 102 of a failure of the update, in step 207. Receiving this notice, the computer 102 is capable of taking a counteraction corresponding to the notice.

The update request that has been received in a normal usage condition in this way is processed so that the contents of the storage device for online 106 and the storage device for backup 107 accord with each other at all times.

Subsequently, the operation of the storage device 101 upon the online backup will be described below as an example of the present embodiment. The operation in this case is divided into three parts; namely, the backup operation with respect to the backup device 103, the online update operation, and the operation for returning from the online backup mode to the normal usage mode.

Figure 3:
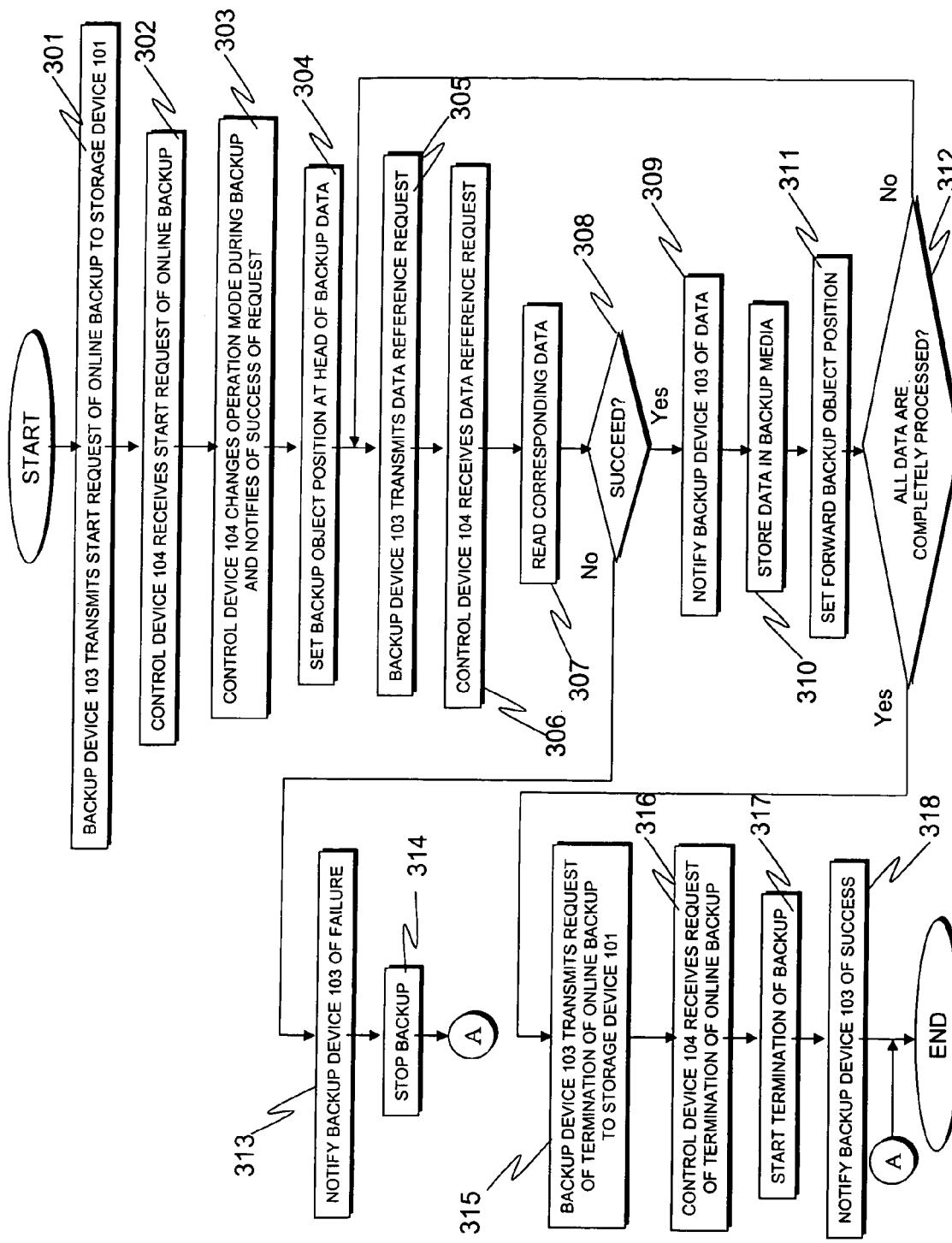
FIG. 3 is a flow chart for showing a process upon the backup of a storage device according to an embodiment of the present invention.

To start, on the basis of the flow chart shown in FIG. 3, the backup operation of the storage device 101 will be explained below. For example, at a backup start time that has been set in advance by an operation manager, the backup device 103 notifies the storage device 101 of the start request of the online backup (step 301). Receiving the request, the control device 104 changes the operation mode of the storage device 101 into the backup mode (step 302). Then, the control device 104 notifies the backup device 103 of receiving this change (step 303). Changing the storage device 101 into the backup mode, the mirroring between the storage device for online 106 and the storage device for backup 107 is released. After the mirroring has been released, the storage device for online 106 and the storage device for backup 107 can be read and written individually by the control device 104.

The backup operations on and after this include steps to be executed with respect to the storage device for backup 107. The backup device 103 sets a head of a storage area for performing the backup as a backup object position (step 304). In the next place, the backup device 103 requests reading of the data that lies in the backup object position (step 306). The control device 104 reads the data that is stored in the storage device for backup 107 in accordance with this request (step 307). In this case, the control device 104 judges whether or not the data can be normally read from the storage device for backup 107 (step 308).

In the case that the reading fails, No in step 308, the control device 104 notifies the backup device 103 of failure of the online backup (step 313) to stop the backup (step 314). After stopping the backup, the backup mode may be returned to the normal usage mode to start the service again or executing a flow shown in FIG. 3 again, the backup may be tried.

When the data can be read normally, Yes in step 308, the control device 104 transmits the read data to the backup device 103 (step 309). Then, this data is stored and saved in the media for backup by the backup device 103 (step 310). After storage and saving, the backup object position is set forward to a position where the next backup data is stored (step 311).

In this case, the backup device 103 judges whether or not all data to be backed up are processed (step 312). If the data to be backed up still remains, No in step 312, the backup device 103 requests the data from the storage device 101 again (step 305).

When all data to be backed up are processed, Yes in step 312, the backup device 103 notifies the storage device 101 of termination of the backup (step 315). Receiving this notice (step 316), the control device 104 performs the termination process of the online backup (step 317) and then, notifies the backup device 103 of success of the process (step 318).

Figure 4:
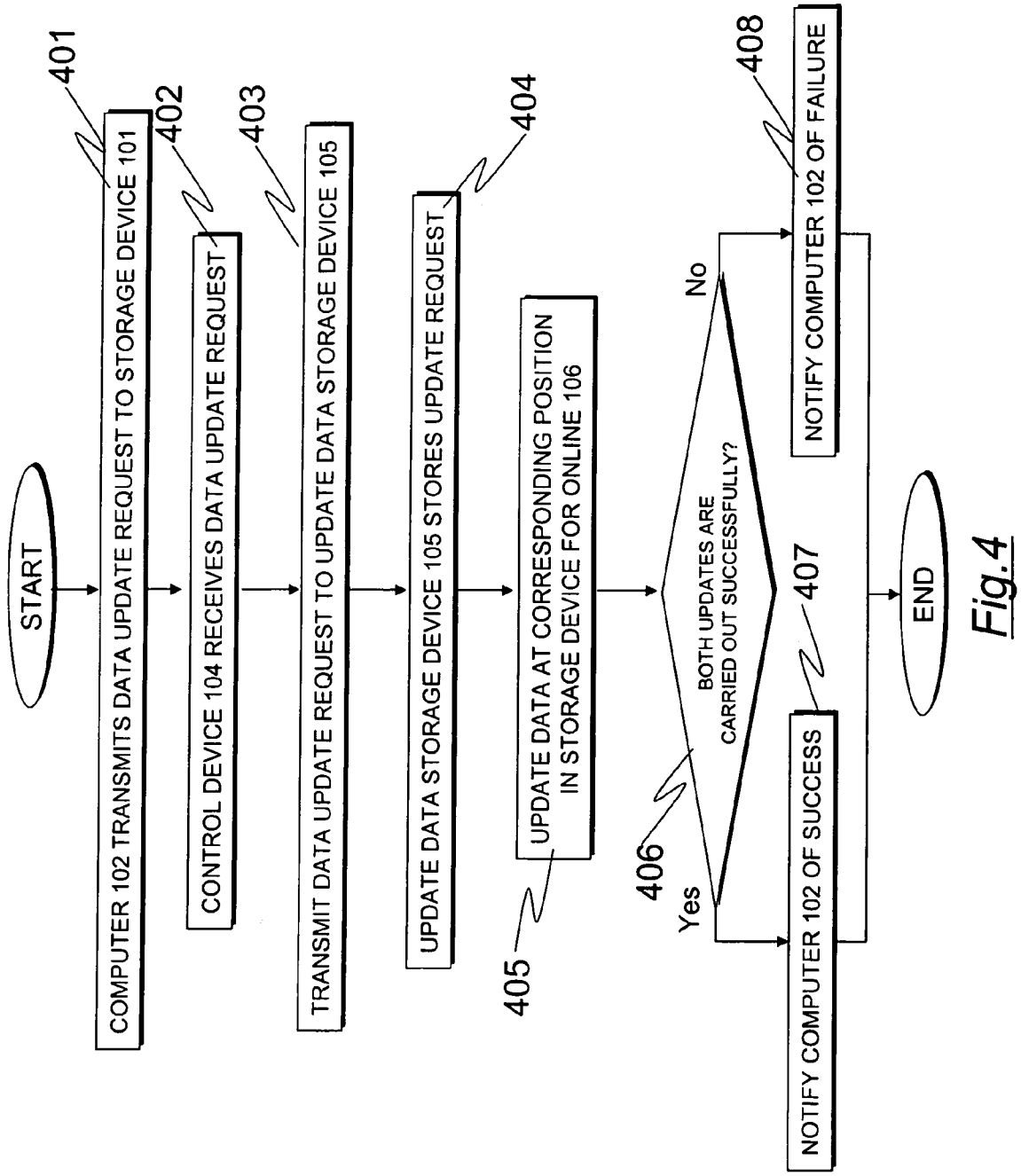
FIG. 4 is a flow chart for showing a process upon the online update of a storage device according to an embodiment of the present invention.

In the next case, the operation of the online update will be explained in accordance with a flow shown in FIG. 4. However, it is assumed that the storage device 101 is already in the backup mode by the request from the backup device 103. The online update is carried out when the update request is issued from the computer 102 in the case that the storage device 101 is in the online backup mode.

In the process of processing the application by the computer 102, the computer 102 issues the update request to the storage device 101 in order to update the stored data or newly store the data (step 401). Receiving this request (step 402), the control device 104 updates the update data storage device 105 (step 403). In the update data storage device 105, the update requests in the online backup mode are stored in turn (step 404).

In the next case, the control device 104 updates the data stored in the storage device for online 106 in accordance with the update request (step 405).

Then, the control device 104 judges whether or not the update processes to the update data storage device 105 and the storage device for online 106 are normally processed (step 406). In the case that these processes are normally carried out, Yes in step 406, the control device 104 notifies the computer 102 of success of the online update (step 407). On the other hand, in the case of failure, No in step 406, the control device 104 notifies the computer 102 of failure of the online update (step 408). The flow shown in FIG. 4 is executed whenever the update request is issued from the computer 102.

While storing the update request in the update data storage device 105 in turn in this way, the control device 104 updates the data of one storage device for online 106 where the mirroring has been performed. Since an update from the computer 102 is possible even during the backup, the computer 102 is capable of continuing the process. Alternatively, even if the storage device for online 106 has a fault during the backup, it is possible to restore the storage content after the last update request since there are the update requests that have been stored in the storage device for backup 107 in turn and the update data storage device 105.

Alternatively, compared to the data amount stored in the storage device for online 106, the data amount to be updated on the basis of the update request that has been received during the online backup is very small. Compared to the method to realize the data update during the backup as preparing another storage device having the same storage capacity as the storage device for online 106, the extra storage capacity of the storage device to be needed by the storage device according to the present invention is only the information amount of the update request of the update data storage device 105. Therefore, according to the storage device of the present invention, it is possible to decrease the storage capacity needed to realize the online backup to a large extent.

Figure 5:
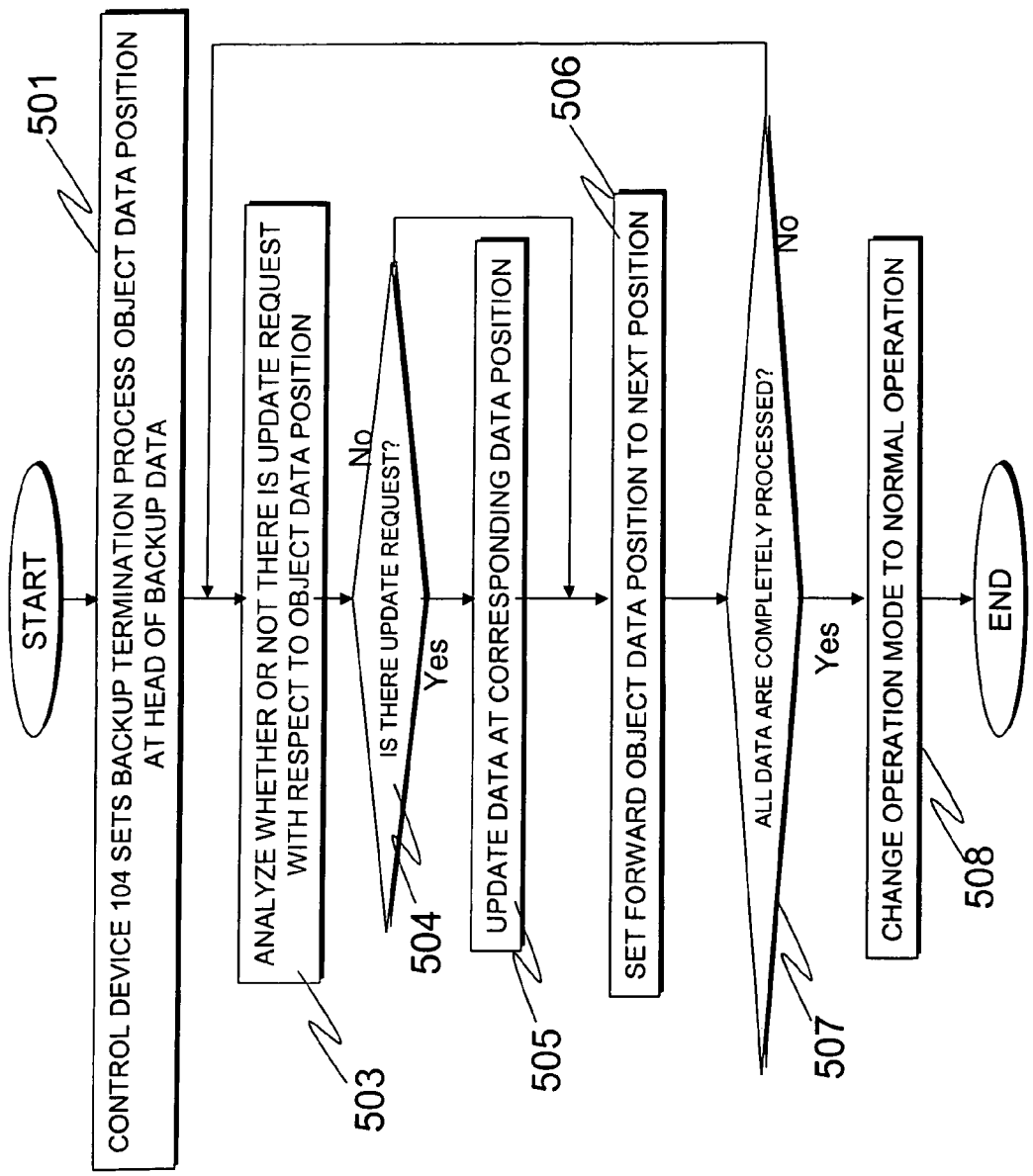
FIG. 5 is a flow chart for showing a process as shifting from the online backup to the normal condition of a storage device according to an embodiment of the present invention.

Finally, the operation such that the storage device 101 returns from the online backup mode to the normal usage condition will be explained in accordance with a flow chart shown in FIG. 5. In this case, the process serves to perform the update, which the storage device 101 carried out with respect to the storage device for online 106 during the online backup mode, also with respect to the storage device for backup 107 so as to start the mirroring between the storage device for backup 107 and the storage device for online 106 again.

Initially, the control device 104 performs the update requests that have been subsequently stored in the update data storage device 105 with respect to the storage device for backup 107. This process is referred to as the backup termination process. A pointer showing a position of a backup termination process object data is set in a certain area within the storage device for backup 107 (step 501). Then, the information within the update requests that have been subsequently stored in the update data storage device 105 is analyzed (step 503). As a result of analysis, it is judged whether or not there is the update request for updating the data lying in a place that is indicated by the pointer (step 504).

In the case that there is not update request for updating the data lying in a place that is indicated by the pointer, No in step 503, without updating the content of the storage device for backup 107, the pointer is set forward to indicate a position where the next backup termination process will be carried out (step 506). In the case that there is the update request for updating the data, Yes in step 503, the storage device for backup 107 updates the data to be stored by the data owned by this update request (step 505). After that, the pointer showing the backup termination process object data position is set forward to indicate a next data position (step 506).

In the next place, the control device 104 judges whether or not the all data to be provided with the backup termination process are processed (step 507). In the case that there is the data to be provided with the backup termination process in the storage device for backup 107, No in step 507, the control device 104 performs the backup termination process again from the step 503.

If the backup termination process has been completed with respect to all data to be provided with the backup termination process, Yes in step 507, the operation mode of the storage device 101 is changed to the normal usage condition (step 508). If the backup termination process has been terminated, the content of the data stored in the storage device for online 106 becomes the same as the content of the data stored in the storage device for backup 107. When the contents stored in the two storage devices become the same, the control device 104 starts the mirroring of the storage device for online 106 and the storage device for backup 107 again.

Performing the process in this way, in comparison with the method to copy the contents of the storage device for online 106, the content of the storage device for backup 107 is made the last condition, so that it is possible to decrease the time required for the process to start the mirroring again to a large extent.

It is not necessary for the update on the basis of the update request with respect to the storage device for backup 107 to be executed by the gross upon termination of series of online backup as described above. For example, the data storage area 108 may be backed up as being segmented into an A area, a B area, and a C area, . . . Before the backup in the area other than the backup object area is terminated, at a point of time when the backup in the A area has been terminated, it is possible to perform the backup termination process with respect to the A area in advance. It is preferable that the control device 104 is constituted so that it starts the mirroring with respect to the A area in advance after the backup termination processing with respect to the A area.

When the condition of the area is appropriately changed to the normal usage condition from a portion where the backup has been completed in this way, it is possible to average the update with respect to the storage device for backup 107. In addition, since the backup is executed as segmented into a small range, it is acceptable that the update data storage device 105 has a storage capacity capable of only storing the update data with respect to the data stored in this small range. Therefore, the storage capacity of the update data storage device 105 can be small.

Alternatively, it is possible to realize the storage device according to the present embodiment by the computer. In this case, a computer program code to realize the flow shown according to the present embodiment, which is capable of being executed by this computer, may be formed.

In addition, even if a portion or all of the constitution according to the present embodiment is replaced with other constitution having the same functions, it is possible to obtain the effect according to the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A backup method in a storage device including a plurality of storage units, and configured to allow fault-tolerant continuous input and output of data even during a data backup, wherein the plurality of storage units include a first storage unit, a second storage unit, and a third storage unit, the backup method comprising:
   performing a backup operation of data stored in the second storage unit to a backup device;
   receiving update data;
   storing the received update data in the third storage unit;
   updating data stored in the first storage unit by utilizing the update data; and
   when there is a failure in the first storage unit during the backup operation, updating data stored in the second storage unit based on the update data stored in the third storage unit and subsequently updating data that has been stored in the first storage unit by utilizing the data stored in the second storage unit.

2. The backup method according to claim 1, wherein the first and second storage units have a same data storage capacity.

3. The backup method according to claim 1, further comprising:

after termination of the backup operation, updating data stored in the second storage unit based on the update data stored in the third storage unit so that contents of data stored in the second storage unit and contents of data stored in the first storage unit are equal.

4. The backup method according to claim 3, wherein:
the updating of the data stored in the second storage unit includes updating the data stored in the second storage unit in units of files;
the second storage unit and the third storage unit are constituted by a plurality of data storage areas having a same data storage capacity; and
the receiving of the update data includes receiving update data with respect to a file including data stored in at least one of the data storage areas.

5. The backup method according to claim 3, wherein:
the second storage unit and the third storage unit are constituted by a plurality of data storage areas having a same date storage capacity; and
each updating of the data stored in the second storage unit includes updating the data stored in the second storage unit based on the update data stored in the third storage unit so that contents of a data storage area of the second storage unit becomes equal to contents of a data storage area of the third storage unit in which the update data is stored.

6. The backup method according to claim 5, further comprising:
when accessing data stored in a data storage area of the second storage unit, converting an address to be accessed into another address indicating a data storage area corresponding to a data storage area of the third storage unit.

7. The backup method according to claim 3, wherein
the second storage unit and the third storage unit are constituted by a plurality of data storage areas having a same data storage capacity; and
each updating of the data stored in the second storage unit includes, when accessing data stored in a data storage area of the second storage unit, converting an address to be accessed into another address indicating a data storage area corresponding to a data storage area of the third storage unit.

8. The backup method according to claim 5, wherein:
each of the data storage area includes a magnetic disk drive; and
each updating of the data stored in the second storage unit includes updating the data stored in the second storage unit in units of the magnetic disk drive based on the update data stored in the third storage unit so that contents of a data storage area of the second storage unit becomes equal to contents of a data storage area of the third storage unit in which the update data is stored.

9. The backup method according to claim 5, wherein:
each of the data storage area includes a file; and
each updating of the data stored in the second storage unit includes updating the data stored in the second storage unit in units of the file based on the update data stored in the third storage unit so that contents of a data storage area of the second storage unit becomes equal to contents of a data storage area of the third storage unit in which the update data is stored.

10. The backup method according to claim 1, wherein:
the second storage unit and the third storage unit are each constituted by a plurality of data storage areas each having a same data storage capacity and each including a magnetic disk drive; and
when there is a failure in the first storage unit during the backup operation, the updating of the data stored in the second storage unit includes updating the data stored in the second storage unit based on the update data stored in the third storage unit so that contents of a data storage area of the second storage unit becomes equal to contents of a data storage area of the third storage unit in which the update data is stored, and subsequently updating data that has been stored in the first storage unit by utilizing the data stored in the second unit,
the backup method further comprising:
updating data stored in the second storage unit based on the update data stored in the third storage unit with beginning with a data storage area of the second storage unit at which the backup operation is terminated, independently of whether or not backup of all data storage areas of the second storage unit has been terminated, so that contents of the data storage area of the second storage unit becomes equal to contents of the data storage area of the third storage unit in which the update data is stored and contents of data stored in the second storage unit and contents of data stored in the first storage unit are equal; and
when further updating data stored in a data storage area after the data storage area has been updated by utilizing the update data stored in the third storage unit, updating data stored in the first storage unit and simultaneously updating data stored in the second storage unit so that contents of the second storage unit becomes equal to contents of the first storage unit.

* * * * *